March 1, 1960 L. P. ELBINGER 2,927,303

APPARATUS FOR READING HUMAN LANGUAGE

Filed Nov. 4, 1958 3 Sheets-Sheet 1

INVENTOR.
LEWIS P. ELBINGER.
BY
Howard M. Duston

INVENTOR.
LEWIS P. ELBINGER.
BY
Howard M. Duston

March 1, 1960 L. P. ELBINGER 2,927,303

APPARATUS FOR READING HUMAN LANGUAGE

Filed Nov. 4, 1958 3 Sheets-Sheet 3

INVENTOR.
LEWIS P. ELBINGER
BY
Howard M. Dustin

United States Patent Office 2,927,303

Patented Mar. 1, 1960

2,927,303

APPARATUS FOR READING HUMAN LANGUAGE

Lewis P. Elbinger, Glendale, Ariz., assignor to General Electric Company, a corporation of New York Application November 4, 1958, Serial No. 771,897

7 Claims. (Cl. 340—149)

This invention relates to a system for automatically reading human language and in particular to apparatus for accurately abstracting information from a document by recognizing waveshapes obtained by scanning human language symbols provided thereon.

A United States patent application by P. E. Merritt and C. M. Steele, filed October 31, 1957, Serial No. 693,773, for an Automatic Reading System, which is assigned to the same assignee as the instant invention, describes and claims a system for automatically reading human language which is printed on documents as symbols in ink capable of being magnetized. The symbols are magnetized and translated in sequence past a transducer provided with a transverse slit. The transducer responds to narrow transverse portions of each symbol, as it is scanned, to generate a distinctive electrical waveshape. The waveshape delivered by the transducer is then sampled at a number of points and the samples are applied to a recognition circuit, which is adapted to energize any one of a plurality of output leads, each output lead corresponding to a different one of the symbols to be recognized by the system. When a symbol is scanned by the transducer, the corresponding output lead provides an electrical signal representative of that symbol for associated utilization apparatus. The recognition circuit comprises a plurality of transmission channels for receiving the waveshape samples, each of the channels being adapted to produce an output signal having a greater amplitude than that produced by any other of the channels when the corresponding waveshape is being sampled; and amplitude sensing apparatus for sampling the output signals of all the channels to detect the channel delivering the greatest amplitude output signal, and in response thereto, for delivering a signal on the output lead corresponding to the symbol being scanned.

The reliability and accuracy of the above-described automatic reading system depends on the ability of the amplitude sensing apparatus to distinguish the greatest amplitude output signal delivered by the transmission channels from the next-greatest output signal. For purposes of the ensuing description, the numerical ratio between this greatest amplitude output signal and the next-greatest amplitude output signal for a particular symbol will be referred to as the symbol dependability factor. Thus, system reliability and accuracy is improved by increasing the symbol dependability factors.

It is, therefore, the principal object of this invention to provide such an improved system for automatically reading human language symbols.

Another object of this invention is to provide increased symbol dependability factors in a system for automatically reading human language symbols.

Another object of this invention is to provide a more accurate and reliable system which abstracts information from a document by responding to human language symbols printed thereon in magnetic ink.

Another object of this invention is to provide improved apparatus for recognizing human language symbols by identifying corresponding waveshapes derived therefrom.

Another object of this invention is to provide improved apparatus for recognizing each of a plurality of different waveshapes.

The foregoing objects are achieved by providing in an automatic symbol reading apparatus of the type heretofore described, a novel signal recognition circuit. The recognition circuit comprises a plurality of transmission channels for receiving the samples of the waveshape derived from the symbol scanned, each of the channels corresponding to a respective one of the symbol waveshapes to be identified. Each channel is adapted to respond to the samples from any one of the waveshapes to produce an output signal having substantially zero amplitude except when the samples are derived from the waveshape corresponding to said channel. Therefore, in this apparatus all of the transmission channels, except that channel corresponding to the symbol being scanned, provide an output signal having substantially zero amplitude. Thus, the symbol dependability factor has theoretically an infinite value and reliability and accuracy of symbol recognition is substantially improved.

The invention will be described with reference to the accompanying drawings, wherein.

*Simple recognition circuit*

Figure 1:
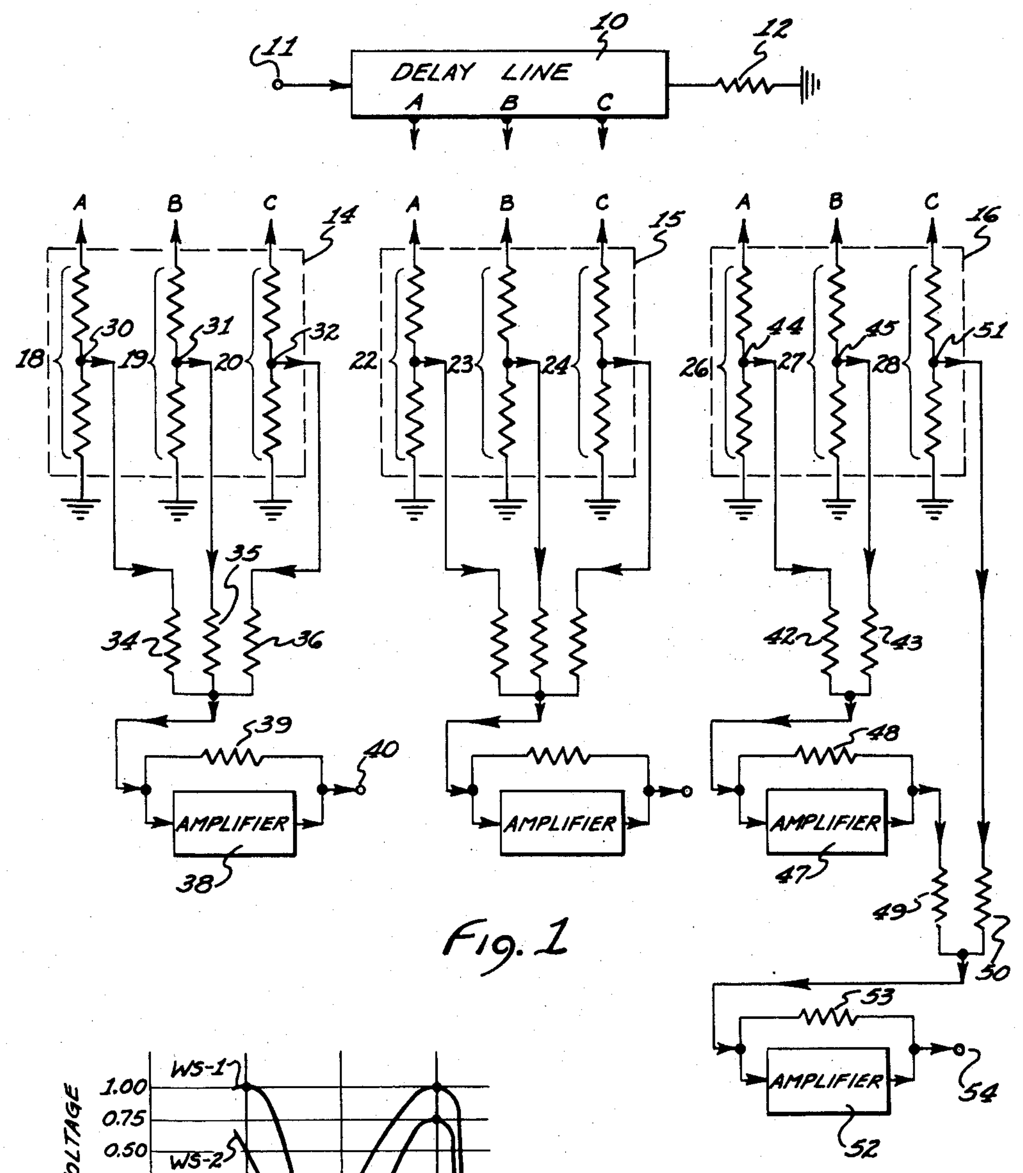
Figure 1 is a schematic diagram of a simple embodiment of this invention.
Figure 2:
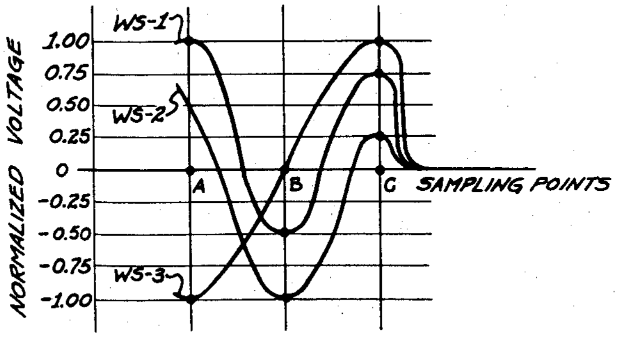
Figure 2 illustrates waveshapes of the type which the embodiment of Fig. 1 is adapted to recognize.

The apparatus of Fig. 1 is adapted to identify each of the three exemplary waveshapes shown in Fig. 2. A wave transmission means, such as delay line 10, which is assumed to be lossless for simplicity in the following discussion, is provided with an input terminal 11 and with the usual reflection-free termination 12. Three wave sampling points, A, B, and C, are connected to line 10 at spaced points therealong. Each sampling point is adapted to provide an output signal proportional to the instantaneous signal present in the delay line at the location of the connection to said sampling point. Thus, as a wave travels along delay line 10, each element thereof appears successively at sampling points A, B, and C.

Three voltage divider networks 14, 15, and 16, adapted to cooperate in the recognition of the respective waveshapes WS–1, WS–2, and WS–3 of Fig. 2 are coupled to delay line 10. Network 14 comprises three voltage dividers 18, 19, and 20, which are connected at one terminal thereof to the respective sampling points A, B, and C of delay line 10 and are connected at their other terminal to ground, or some other suitable reference potential. Network 15 comprises voltage dividers 22, 23, and 24, which are connected between ground and respective sampling points A, B, and C. Network 16 comprises voltage dividers 26, 27, and 28, which are connected between ground and respective sampling points A, B, and C.

Generally, the design of each voltage divider network is conditioned by all waveshapes to be recognized by the apparatus of Fig. 1, except the particular waveshape to be identified by that voltage divider network. Thus, voltage divider network 14 is adapted to cooperate in the recognition of waveshape WS–1 of Fig. 2, so that its design is conditioned by the configuration of waveshapes WS–2 and WS–3. In accordance with the principles of this invention, whenever waveshape WS–2 or waveshape WS–3 occupies a predetermined position in delay line 10, voltage divider network 14 delivers at the voltage divider taps thereof a plurality of voltages which, when properly combined in a summing circuit, provide substantially zero output signal therefrom. Only when waveshape WS–1 is present in delay line 10 will the voltages delivered by the voltage divider taps of network 14 combine to provide a finite value of output signal from the summing circuit.

Similarly, voltage divider network 15, which is adapted to cooperate in the recognition of waveshape WS–2, delivers at the voltage divider taps thereof a plurality of voltages, which combine in a corresponding summing circuit to provide substantially zero output signal therefrom whenever waveshape WS–1 or WS–3 occupies its predetermined position in delay line 10. Voltage divider network 16, which is adapted to cooperate in the recognition of waveshape WS–3, delivers at the voltage divider taps thereof a plurality of voltages, which combine in a corresponding summing circuit to provide substantially zero output signal therefrom whenever waveshape WS–1 or WS–2 occupies its predetermined position in the delay line.

A method of design of voltage divider networks 14, 15, and 16 and a geometric picture for aiding in the understanding of this method of design will now be described. In accordance with the principles of this invention, each voltage divider network is designed to respond to the signal samples provided by the delay line when a waveshape occupies its reference position therein to provide a plurality of voltages at the voltage divider taps which, when properly combined in a corresponding summing circuit, provide substantially zero output signal therefrom, except when the waveshape in the line is one which said divider network is to identify. The amplitude and configuration of a waveshape applied to the delay line depends on the relative intensity of the magnetic field of the symbol, on the frequency and gain characteristics of any amplifiers employed, on the type of scanning transducer employed, etc. However, for each different symbol to be recognized, a distinctive electrical waveshape is provided. Thus, the three waveshapes of Fig. 2 are respectively the distinctive waveshapes for the three symbols to be recognized by the apparatus of Fig. 1. (It will be noted that the waveshapes shown in Fig. 2 are reversed from conventional presentations, since earlier generated voltages appear farther to the right than later delivered voltages. This type of presentation will better serve to explain the operation of this invention, as it corresponds to the spatial distribution of the waveshape as it travels along the delay line.) For convenience in the method of design to be described, each waveshape has been normalized so that its maximum amplitude has a value of 1.0. In thus normalizing a waveshape, all portions thereof are correspondingly reduced or increased so that the configuration thereof is preserved. Hence, the waveshapes, as shown in Fig. 2, remain distinctive of the symbols from which they were derived.

When waveshape WS–1 occupies its predetermined position in delay line 10 (the position shown in Fig. 2), the following voltage samples are delivered at respective sampling points A, B, and C: +1.00, −0.50, +0.75. When a waveshape occupies its predetermined position in the delay line at which it delivers the samples which are employed for conditioning the design of the voltage divider networks, it is said to occupy its "reference position." Waveshape WS–1 is thus characterized by three voltage samples and may be represented by a vector $S_1$ (Fig. 3) in three-dimensional space. Vector $S_1$ is constructed in the three-dimensional coordinate system $x_1$, $x_2$, $x_3$, wherein its three components along the $x_1$, $x_2$, and $x_3$ axes are respectively the three voltage samples of waveshape WS–1, +1.00, −0.50, +0.75.

In a similar manner, waveshapes WS–2 and WS–3 may each be represented by a vector in the three-dimensional space. The components of vector $S_2$, which represents waveshape WS–2, are +0.50, −1.00, +0.25. The components of vector $S_3$, which represent waveshape WS–3 are −1.00, 0, and +1.00.

Consider now the effect of the voltage dividers of networks 14, 15, and 16 on the voltage samples provided by delay line 10. Each voltage divider effectively multiplies the amplitude of the voltage received at its input terminal by a factor less than, or equal to, unity and delivers a corresponding output signal at the tap thereof. Thus, voltage divider 18 multiplies the voltage received from sampling point A by a factor hereinafter termed the voltage division ratio, and delivers the corresponding output voltage at tap 30. The position of the tap of a voltage divider determines the voltage division provided. For example, if the upper portion of voltage divider 18 were equal to one-third the lower portion, a voltage division ratio of three-quarters would be provided.

Each of the three voltage samples provided by delay line 10 is multiplied by the voltage division ratio of the corresponding voltage divider of each voltage divider network. The voltages delivered at all of the voltage divider taps of each voltage divider network are combined in a corresponding summing network, to be described hereinafter. Thus, the summation of the voltages delivered at the taps of voltage divider network 14, when waveshape WS–1 occupies its reference position in delay line 10, is given by $$r_{11}s_{11}+r_{12}s_{12}+r_{13}s_{13}=\Sigma_{11} \quad (1)$$

In this equation $r_{11}$, $r_{12}$, and $r_{13}$ represent respectively the voltage division ratios of dividers 18, 19, and 20. The terms $s_{11}$, $s_{12}$, and $s_{13}$ are the voltage samples delivered at the respective sampling points A, B, and C when waveshape WS–1 occupies its reference position in the delay line, and are, therefore, the components of vector $S_1$ in Fig. 3. The term $\Sigma_{11}$ represents the summation of the voltages delivered at the taps of voltage divider network 14.

Similarly, summation terms for the voltages delivered at the voltage divider taps of network 14 when waveshapes WS–2 and WS–3 occupy their reference positions in the delay line are given respectively by $$r_{11}s_{21}+r_{12}s_{22}+r_{13}s_{23}=\Sigma_{12} \quad (2)$$

$$r_{11}s_{31}+r_{12}s_{32}+r_{13}s_{33}=\Sigma_{13} \quad (3)$$

The terms $s_{21}$, $s_{22}$, and $s_{23}$ are the voltage samples of waveshape WS–2 at its reference position, and, therefore, the components of vector $S_2$. The terms $s_{31}$, $s_{32}$, and $s_{33}$ are the voltage samples of waveshape WS–3 at its reference position, and, therefore, are the components of vector $S_3$.

Inasmuch as the terms $s_{11}$, $s_{12}$, and $s_{13}$ in Equation 1 may be represented as the components of a vector $S_1$, the summation term $\Sigma_{11}$ may be considered as the scalar product of the vector $S_1$ and another vector, designated $R_1$, having the components $r_{11}$, $r_{12}$, $r_{13}$, as follows:

$$R_1.S_1=\Sigma_{11} \quad (4)$$

(H. B. Phillips, "Vector Analysis," John Wiley and Sons, Inc., New York, 1946, pages 7–9). The components $r_{11}$, $r_{12}$, and $r_{13}$ are parallel respectively to the components $s_{11}$, $s_{12}$, and $s_{13}$ of vector $S_1$. Thus, the scalar product of a pair of vectors is the sum of the individual products of the parallel components of the two vectors. The vector $R_1$ in Equation 4 is a representation of voltage divider network 14, since the components thereof are equal to the respective voltage division ratios of network 14.

Similarly, Equations 2 and 3 may be rewritten respectively as $$R_1.S_2=\Sigma_{12} \quad (5)$$

$$R_1.S_3=\Sigma_{13} \quad (6)$$

Figure 3:
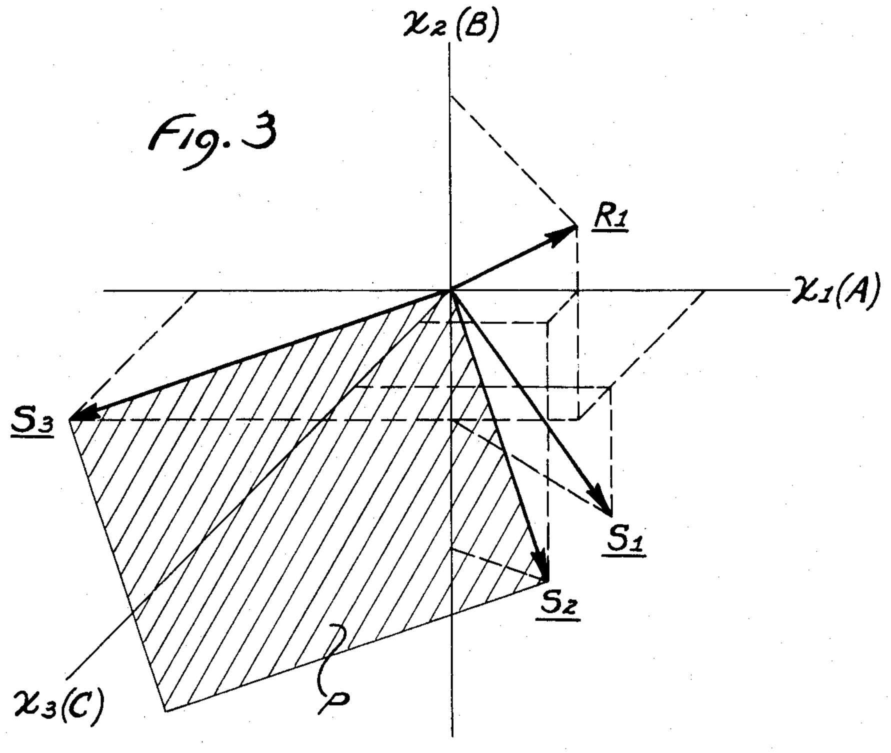
Figure 3 is a vector diagram employed to assist in an understanding of this invention.

Vector algebra teaches that the scalar product of two orthogonal vectors is zero. If the vector $R_1$ is perpendicular to both of the vectors $S_2$ and $S_3$, the terms $\Sigma_{12}$ and $\Sigma_{13}$ in Equations 5 and 6 will each be equal to zero. Vector $R_1$ may be constructed to be perpendicular to both of the vectors $S_2$ and $S_3$ by orienting its direction so that it lies perpendicular to the plane P containing vectors $S_2$ and $S_3$, as shown in Fig. 3. From this orientation of vector $R_1$, its components $r_{11}$, $r_{12}$, and $r_{13}$ may be determined. These are the values of the voltage division ratios of the respective voltage dividers 18, 19, and 20.

The voltage division ratios may also be determined analytically as follows. Equations 2 and 3 are each set equal to zero and are solved simultaneously for two of the unknown voltage division ratios in terms of the third. The third voltage division ratio may then be set arbitrarily to a desired value, such as a value to insure adequate signal amplitudes throughout the circuit, and the remaining two voltage division ratios will then be determinable. Thus, Equations 2 and 3 are written as follows:

(7) $$r_{11}(0.50)+r_{12}(-1.00)+r_{13}(0.25)=0$$

(8) $$r_{11}(-1.00)+r_{12}(0)+r_{13}(1.00)=0$$

Solving Equations 7 and 8 for $r_{11}$ and $r_{12}$ in terms of $r_{13}$ there results:

(9) $$r_{11}=r_{13}$$

(10) $$r_{12}=0.75\ r_{13}$$

Setting $r_{13}$ to the arbitrary value of 1.00, the three voltage division ratios are:

(11) $$r_{11}=1.00 \quad r_{12}=0.75 \quad r_{13}=1.00$$

Where a voltage division ratio of 1.00 is indicated, no actual voltage divider is necessary, but instead, the voltage sample may be taken directly from the corresponding delay line tap.

A voltage divider network having the respective voltage division rations indicated by Equation 11 will deliver at the voltage divider taps thereof three voltages which may be combined to provide a summation voltage having zero amplitude, whenever waveshape WS–2 or WS–3 is present at its reference position in the delay line. The network will deliver a finite summation voltage when waveshape WS–1 is present.

Similarly, a vector representing the voltage division ratios of network 15 is constructed to be perpendicular to a plane containing vectors $S_1$ and $S_3$. The resulting voltage division ratios are:

(12) $$r_{21}=0.286 \quad r_{22}=1.00 \quad r_{23}=0.286$$

In obtaining these values, one voltage division ratio was again arbitrarily set equal to 1.00. Voltage divider network 15 so designed is adapted to provide a summation voltage equal to zero whenever waveshape WS–1 or WS–3 is present at its reference position and to provide a finite summation voltage when waveshape WS–2 is present. A vector representing the voltage division ratios of network 16 is constructed to be perpendicular to a plane containing vectors $S_1$ and $S_2$. The resulting voltage division ratios are:

(13) $$r_{31}=-0.833 \quad r_{32}=-0.167 \quad r_{33}=1.00$$

In obtaining these values, one voltage division ratio was again arbitrarily set equal to 1.00. Voltage divider network 16 so designed is adapted to provide a summation voltage equal to zero whenever waveshape WS–1 or WS–2 is present at its reference position and to provide a finite summation voltage when waveshape WS–3 is present.

If delay line 10 is not lossless, each waveshape element is continuously reduced as it travels along the line. Therefore, the predicted waveshape sample provided at each sampling point must be reduced in proportion to the total attenuation of the line between input terminal 11 and the respective sampling point. It is these attenuated waveshape samples which are employed in the determination of the voltage division ratios. Such a technique is described in the aforementioned patent application S.N. 693,773.

Circuits which provide signals representing the summation of the voltages delivered at all of the voltage divider taps of each voltage divider network will now be described. In one of these circuits, shown in Fig. 1, three resistors 34, 35, and 36 are connected together at one of their terminals and the other terminal of each resistor is connected to a respective one of taps 30, 31, and 32. A high-gain amplifier 38 and a resistor 39 are connected in parallel between the common connection point of resistors 34, 35, and 36 and an output terminal 40. Resistors 34, 35, 36, and 39 each have the same value of resistance, so that the voltage delivered at terminal 40 represents the algebraic sum of the voltages provided at the taps of the voltage dividers. This common resistance value of resistors 34, 35, 36, and 39 is large compared with the resistance values of voltage dividers 18, 19, and 20, so that the voltages provided at the taps of these dividers will be substantially unaffected by the inclusion of the summing circuit described. (A summing circuit, as shown, is described in a book by G. A. Korn, "Electronic Analog Computers," page 11, McGraw-Hill Book Company, Inc., New York, 1952.) The summation voltage delivered at terminal 40 is negative with respect to the voltages delivered at taps 30, 31, and 32 because of the signal inversion of amplifier 38.

A summing circuit similar to that described above is shown connected to the taps of voltage divider network 15 to provide the summation signal therefor.

Referring once again to Equation 13, it will be noted that a negative multiplying factor must be supplied by each of voltage dividers 26 and 27 and a positive multiplication factor by voltage divider 28 of network 16. One circuit for obtaining such a negative multiplying factor and for providing the necessary summation voltage is shown coupled to voltage divider network 16. A pair of resistors 42 and 43 are connected together at one of their terminals and the other terminal of each resistor is connected to a respective one of taps 44 and 45. A high-gain amplifier 47 and a resistor 48 are connected in parallel between the common connection point of resistors 42 and 43 and one terminal of a resistor 49. As previously described, resistors 42, 43, and 48 each have the same value of resistance, which is large compared with the resistance values of voltage dividers 26 and 27. Thus, the voltage delivered by amplifier 47 represents the negative sum of the voltages provided at taps 44 and 45. One terminal of a resistor 50 is connected to tap 51 of divider 28. Resistors 49 and 50 are connected together at the other of their terminals. A high-gain amplifier 52 and a resistor 53 are connected in parallel between the common connection point of resistors 49 and 50 and an output terminal 54. Resistors 49, 50, and 53 each have the same value of resistance, which is large compared with the resistance values of voltage divider 28. Thus, amplifier 52 delivers an output voltage at terminal 54 representing the sum of the voltages applied to resistors 49 and 50. Inasmuch as amplifier 47 provides a negative voltage proportional to the sum of the two positive voltages supplied at taps 44 and 45, these two voltages are effectively subtracted from the voltage delivered at tap 51. The resulting summation voltage is provided as a negative voltage at terminal 54. The intermediate amplifier 47 effectively provides a negative multiplying factor for the voltages summed thereby.

There has thus been described a set of three voltage divider and summing circuits for the circuit of Fig. 1, each corresponding to a different one of the waveshapes to be recognized, and each adapted to provide a zero summation voltage in response to samples from the two waveshapes which do not correspond thereto. Therefore, when waveshape WS–3 occupies its reference position in delay line 10, it may be identified by the fact that voltage divider network 16 and its summing circuit delivers a finite voltage, whereas voltage divider networks 14 and 15 and their summing circuits deliver substantially zero voltages. In a similar manner, voltage divider network 14 delivers a finite voltage for waveshape WS–1 while divider networks 15 and 16 deliver substantially zero voltages. Voltage divider network 15 delivers a finite voltage for waveshape WS–2 while divider networks 14 and 16 deliver substantially zero voltages. Recognition networks so designed insure greater symbol dependability factors by delivering for each waveshape a single finite voltage to one output terminal and a plurality of substantially zero voltages to the remainder of the output terminals.

*Complete recognition circuit*

A complete automatic reading system is adapted to read $n$ human language symbols. The term "human language symbol," as used herein, means a figure that conveys information, or is recognizable from its shape and orientation; such as figures having the shapes and orientations of letters of the alphabet, numerals, punctuation marks, etc. Human language symbols are to be distinguished from permutations and combinations of groups of key elements employed to convey information; such as Morse codes, punched paper tape codes, etc.

In the complete system, a voltage divider network of the type heretofore described and its cooperating summing network is provided for each of the $n$ waveshapes derived from the $n$ symbols to be recognized. A waveshape is sampled at $n$ points and each of the $n$ samples is applied to a corresponding voltage divider of all of the voltage divider networks. Each of the voltage divider networks is adapted to cooperate in the recognition of a respective one of the $n$ different waveshapes by supplying at the voltage divider taps thereof a plurality of voltages which may be combined in a summing circuit to yield a substantial output signal only in response to samples from said one waveshape.

Consider again the geometric picture of the problem. A vector in $n$-dimensional space, which represents the $n$ voltage division ratios of a voltage divider network, is oriented to be orthogonal to a surface which contains, or is defined by, $n-1$ vectors representing respectively the $n$ samples of each of $n-1$ of the waveshapes to be identified. The mathematical relationship which specifies that the scalar product of the vector representing the voltage divider network is orthogonal to each of these $n-1$ waveshape vectors is:

$$(14)\quad \begin{array}{l} r_{i1}s_{11}+r_{i2}s_{12}+r_{i3}s_{13}+\ldots+r_{in}s_{1n}=0 \\ r_{i1}s_{21}+r_{i2}s_{22}+r_{i3}s_{23}+\ldots+r_{in}s_{2n}=0 \\ r_{i1}s_{31}+r_{i2}s_{32}+r_{i3}s_{33}+\ldots+r_{in}s_{3n}=0 \\ \quad\cdot \qquad\quad \cdot \qquad\quad \cdot \qquad\qquad\quad \cdot \qquad\quad \cdot \\ r_{i1}s_{i-1,1}+r_{i2}s_{i-1,2}+r_{i3}s_{i-1,3}+\ldots+r_{in}s_{i-1,n}=0 \\ r_{i1}s_{i+1,1}+r_{i2}s_{i+1,2}+r_{i3}s_{i+1,3}+\ldots+r_{in}s_{i+1,n}=0 \\ \quad\cdot \qquad\quad \cdot \qquad\quad \cdot \qquad\qquad\quad \cdot \qquad\quad \cdot \\ r_{i1}s_{n1}+r_{i2}s_{n2}+r_{i3}s_{n3}+\ldots+r_{in}s_{nn}=0 \end{array}$$

The terms $r_{i1}$, $r_{i2}$ . . . $r_{in}$ represent the $n$ voltage division ratios of the $i$th voltage divider network, and are the unknown values which are found by solving Equation Set 14. The term $s_{uv}$ in Equation Set 14 represents the $v$th voltage sample of the $u$th waveshape. The equations of Set 14 are solved simultaneously to determine $n-1$ of the unknown voltage division ratios in terms of the remaining voltage division ratio. This remaining voltage division ratio may then be set arbitrarily to a desired value, such as a value to insure adequate signal amplitudes from the summing networks, or a value to insure uniform signal amplitudes from the summing networks. When this remaining voltage division ratio has been so set, the aforementioned $n-1$ voltage division ratios are determinable. With the voltage division ratios of the $i$th voltage divider network determined in accordance with Equation Set 14, a finite voltage will only be delivered by the $i$th voltage divider network for the $i$th waveshape; as follows:

$$r_{i1}s_{i1}+r_{i2}s_{i2}+r_{i3}s_{i3}+\ .\ .\ .\ +r_{in}s_{in}=0$$

A circuit containing $n$ such voltage divider networks is adapted to recognize $n$ different waveshapes and their corresponding symbols.

The output terminal of the summing network corresponding to the waveshape present in the delay line will deliver the greatest output signal, and theoretically, the other summing networks will deliver substantially zero amplitude output signals. Thus, the signals received directly from the summing network output terminals may be employed as an indicia of the symbol scanned. However, if the noise content of the signals is large and varying, if similar symbols are not always printed substantially alike, if the magnetization of the symbols is not always uniform, or if the waveshapes are not always sampled precisely in their reference position, all of the summing networks may deliver small spurious output signals or substantial and varying amounts of noise. In such event, it is desirable to employ a circuit which senses all output signals of the summing networks, determines that summing network delivering the greatest amplitude signal, and in response thereto, delivers a signal on the output lead corresponding to the symbol being scanned. Such a circuit is shown in Fig. 4.

*Automatic symbol reader embodiment*

Figure 4:
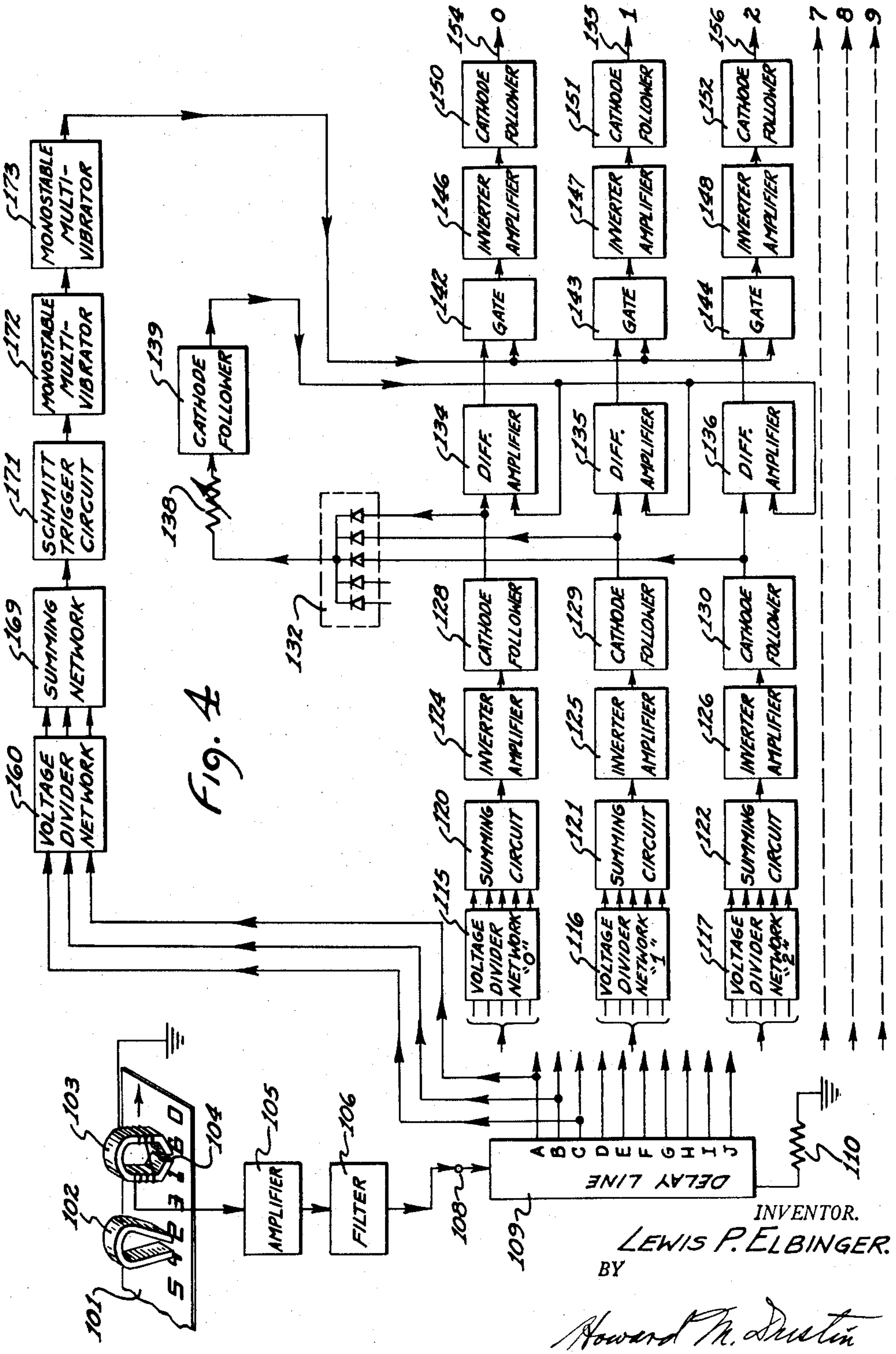
Figure 4 is a schematic diagram of an embodiment of this invention.

Figure 4 illustrates an embodiment of this invention, including the voltage divider and summing networks heretofore described, circuits for interpreting the output signals of the summing networks, and associated input equipment. This embodiment is designed to recognize the numerals 0 to 9. However, it is to be understood that the scope of this invention is not limited to the recognition of numerals, but instead, letters and other symbols such as +, –, punctuation marks or other geometric configurations may be recognized by this invention.

A document 101, such as a sheet of paper which has human language symbols imprinted thereon in ink adapted to be magnetized is moved past a magnet 102 and then past a transducer 103. Magnet 102, which may be a permanent magnet, magnetizes the symbols to be recognized prior to their "reading" by transducer 103. Transducer 103, which may also be termed "a magnetic reading head," is provided with a narrow slit 104 oriented transversely to the direction of motion of document 101. Reading head 103 is responsive to the time rate-of-change of the magnetic flux induced therein by the passing magnetized symbols and delivers an output signal corresponding to these flux changes. Thus, the output signal provided by head 103 is a function of time, the magnitude thereof at any instant being determined by the shape and orientation of the magnetized area passing slit 104 at that moment. Waveshapes similar to those shown in Fig. 2 are thus generated as relative motion is provided between head 103 and the respective magnetized symbols.

The output signal of reading head 103 is applied to an amplifier 105, the output signal of which is applied in turn to a low-pass filter 106. It is the function of filter 106 to limit the high-frequency content of the waveshape in order to improve the accuracy of recognition. A theory relating the waveshape frequency content to the waveshape samples is described in the aforementioned patent application S.N. 693,773.

The signal delivered by filter 106 is applied to an input terminal 108 of a delay line 109, which is provided with the usual reflection-free termination 110. Delay line 109 is provided with a plurality of sampling points A—J spaced therealong, the spacing between adjacent sampling points being substantially uniform. The total distance between sampling point A and sampling point J is somewhat less than the total distance between the leading trailing edges of the longest waveshape to be recognized when the waveshape is fully within delay line 109. Therefore, when the waveshape occupies its reference position in the delay line, point J samples the waveshape near its leading edge and point A samples the waveshape near its trailing edge.

Ten voltage divider networks are provided for identifying each of the respective ten numerals 0–9. The design of each of these networks is conditioned by a different group of nine of the numeral waveshapes to be recognized. Only three of these voltage divider networks 115, 116, and 117, and their cooperating electronic apparatus, are shown in Fig. 4 for the purpose of simplicity. Each of the ten voltage dividers of voltage divider network 115 is connected to a respective one of the sampling points A—J of delay line 109. Similarly, corresponding voltage dividers of voltage divider networks 116 and 117 are connected to respective sampling points of delay line 109. The taps of all voltage dividers of network 118 are connected to an appropriate summing circuit 120, which is adapted to add the voltages provided at said taps in a manner similar to that shown in Fig. 1. Similarly, summing circuits 121 and 122 are connected to the taps of respective voltage divider networks 116 and 117, and each network delivers an output signal corresponding to the summation of the tap voltages delivered thereto.

Voltage divider network 115 is adapted to recognize the numeral 0. Therefore, in accordance with the principle of this invention, the voltage division ratios of network 115 are adapted to provide a plurality of voltages at the voltage divider taps thereof which, when combined by associated summing circuit 120, will yield zero amplitude output voltage from circuit 120 whenever one of the waveshapes derived from the numerals 1–9 occupies its reference position in delay line 109. Only when the waveshape derived from the numeral 0 is present, is a finite amplitude output voltage delivered by summing circuit 120. Similarly, voltage divider network 116 is adapted to recognize the numeral 1. Network 116 and its associated summing circuit 121 deliver substantially zero amplitude output voltage whenever one of the waveshapes derived from the numerals 0 and 2–9 occupies its reference position in delay line 109. A finite amplitude output voltage is delivered by circuit 121 only when the numeral 1 waveshape occupies its reference position. Voltage divider network 117 is adapted to recognize the numeral 2. Network 117 and its associated summing circuit 122 deliver substantially zero amplitude output voltage whenever one of the waveshapes derived from the numerals 0, 1 and 3–9 occupies its delay line reference position. A finite amplitude output voltage is delivered by circuit 122 only when the numeral 2 waveshape occupies its reference position. The remaining seven voltage divider networks, not shown, are each adapted, in a similar manner, to recognize their corresponding numerals. Each of the voltage divider networks of Fig. 4 is designed in accordance with Equation Set 14, wherein $n=10$.

The apparatus to the right of each of summing circuits 120—122 is employed to interpret the signals delivered thereby, and in response thereto, to deliver an output signal on only one of a number of leads, said output signal corresponding to the numeral scanned.

The output signal from each of summing circuits 120—122 is applied to a respective one of amplifiers 124, 125, and 126, where the signal is inverted and amplified. The output signal from each of amplifiers 124—126 is applied in turn to a respective one of cathode followers 128, 129, and 130. The output signal from each of cathode followers 128—130 is applied to a respective one of the diodes of a peak detector 132. The output signal from each of cathode followers 128—130 is also applied to one input terminal of a respective one of difference amplifiers 134, 135, and 136.

Peak detector 132 is adapted to receive a plurality of signals applied respectively to the diodes thereof and to deliver a signal at its output terminal substantially equal to the most positive of the received signals. Several forms of peak detectors are well known in the art. A logical OR-gate is one form of peak detector which may also be employed. Ten signals from the ten cathode followers associated with the summing networks are applied respectively to the ten diodes of detector 132. Thus, the output signal of peak detector 132 is substantially equal to the most positive of these ten applied signals. The output terminal of peak detector 132 is connected to an attenuator 138, which in turn is connected to a cathode follower 139. The function of attenuator 138 will be described below.

The output signal from cathode follower 139 is applied to the other input terminal of each of the ten difference amplifiers; i.e., difference amplifiers 134—136. Each of difference amplifiers 134—136 may be of a type well known in the art, such as those shown in a book by G. E. Valley, Jr., and H. Wallman, "Vacuum Tube Amplifiers," sec. 11.10, McGraw-Hill Book Company, Inc., New York, 1948. Each of the difference amplifiers of Fig. 4, is one which provides an output voltage that is positive with respect to an arbitrary reference voltage only if a signal applied to one of its input terminals exceeds a signal applied to its other input terminal; otherwise, the output voltage is negative. Each of difference amplifiers 134—136 is so connected that only when the signal received from the corresponding one of cathode followers 128—130 exceeds the signal received from cathode follower 139 does it deliver such a positive output voltage.

Attenuator 138 is adjusted to attenuate a signal applied thereto by a predetermined amount so that the only one of the difference amplifiers 134—136 which delivers a positive output voltage is the one receiving the most-positive signal from cathode followers 128—130. Attenuator 138 is so set that the signal delivered by a cathode follower 139 is always more positive than the second-largest signal from cathode followers 128—130, this second-largest signal being due to noise, or being a spurious signal due to causes previously described. Thus, when any one of the ten waveshapes to be recognized occupies its reference position in delay line 109, only the corresponding one of the ten difference amplifiers delivers a positive output voltage. However, if the waveshape samplied is one not intended to be recognized by the system or is substantially distorted, or if the sampling signals are taken when the waveshape is not close to its reference position, it is possible that a positive output signal may be provided by two or more difference amplifiers. In this event, an error signal detector, not shown, may be employed to reject the information read from the document. However, the large symbol dependability factor realized in this invention, wherein the theoretical second-largest signals from cathode followers 128—130 are zero, permits substantial waveshape distortion from the theoretical form, substantial inaccuracies in the time of sampling the waveshape, and substantial circuit noise before the actual second-largest signal approaches the amplitude of the largest signal so as to indicate an error.

The output signals from difference amplifiers 134—136 are applied to respective signal input terminals of gates 142—144. Each of these gates is an amplifier-type of gate, providing an output signal that is the amplified inverse of its gated input signal. Only when the input signal and a gating pulse applied thereto each exceed a reference or a threshold voltage does the gate conduct. Suitable gates for this purpose are shown in a book by Engineering Research Associates, "High Speed Computing Devices," sec. 4-3-3, McGraw-Hill Book Company, Inc., New York, 1950. The object of gates 142—144 is to provide for sampling the output voltages of the corresponding difference amplifiers only when the waveshape is in its reference position in the delay line. A positive sampling trigger signal, which is provided when the waveshape reaches its reference position, is applied as the gating pulse to the other input terminal of each of gates 142—144. In this manner, the waveshape samples actually participating in the symbol recognition are those whose theoretical values were employed in the design of the voltage divider networks.

Each of gates 142—144 is connected to a respective one of inverter amplifiers 146, 147, and 148. Only those gates receiving a positive input signal from the corresponding difference amplifier will deliver output signals, which are of negative polarity. These output signals of gates 142—144 are amplified and inverted by inverter amplifiers 146—148 and applied to a respective one of cathode followers 150, 151, and 152. Each of cathode followers 150—152 delivers its output signal on a respective one of output leads 154, 155, and 156. Whenever a waveshape reaches its reference position in delay line 109, the sampling trigger signal actuates gates 142—144 in order to sample the respective output voltages of difference amplifiers 134—136. If the waveshape is derived from one of the symbole to be recognized, a positive output signal will be provided by the corresponding one of the output leads, which are identified by the numerals written thereby. For example, if the symbol "0" is scanned, a signal is provided on lead 154.

*Waveshape presence circuit*

Generation of a sampling trigger signal is initiated in a voltage divider network 160 (Fig. 5), which samples the leading edge of the waveshape as it enters delay line 109. Network 160 comprises voltage dividers 161, 162, and 163, connected between respective sampling points A, B, and C of delay line 109 and ground. It is the function of network 160 and the circuit elements associated therewith to sense the presence of the leading edge of a waveshape as it enters delay line 109, and in response thereto, to generate a sampling trigger signal when the waveshape reaches its reference position in the delay line.

The voltage devision ratios of all of dividers 161-163 are alike and may be identified numerically as "y." Taps 164 and 165 of dividers 162 and 163 are connected to a summing circuit 166, which is of a type previously described. The output voltage of summing circuit 166 is the negative sum of the voltages provided by taps 164 and 165. The output voltage of summing circuit 166 and the voltage of tap 167 of voltage divider 161 are applied to a summing circuit 168. Thus, the output voltage of summing circuit 168 is given by:

$$V = -y[V_A - (V_B + V_C)] \quad (15)$$

where $V_A$, $V_B$, and $V_C$ represent the voltages delivered at respective sampling points A, B, and C.

Referring now to any one of the waveshapes of Fig. 2, it is seen that the leading edge thereof increases positively. This is because the magnetic flux coupled to the transducer increases as the transducer approaches the leading edge of the symbol. As the waveshape enters delay line 109, sampling point A is first to deliver an output voltage, which is positive. Thus, the first portion of the leading edge of a symbol waveshape provides an increasing negative output voltage from the inverting summing circuit 168. As the waveshape progresses further along line 109, the output voltages from sampling points B and C, which are added together, become more positive. Eventually, the negative voltage delivered by summing circuit 166 becomes equal in magnitude to the positive voltages delivered by voltage divider 161, so that the output voltage of summing circuit 168 passes through zero and becomes positive. This change in output signal polarity of summing circuit 168, occasioned by the advance of the waveshape leading edge along delay line 109, is employed to indicate the presence of the waveshape in the delay line and to provide the aforementioned sampling trigger signal.

Figure 5:
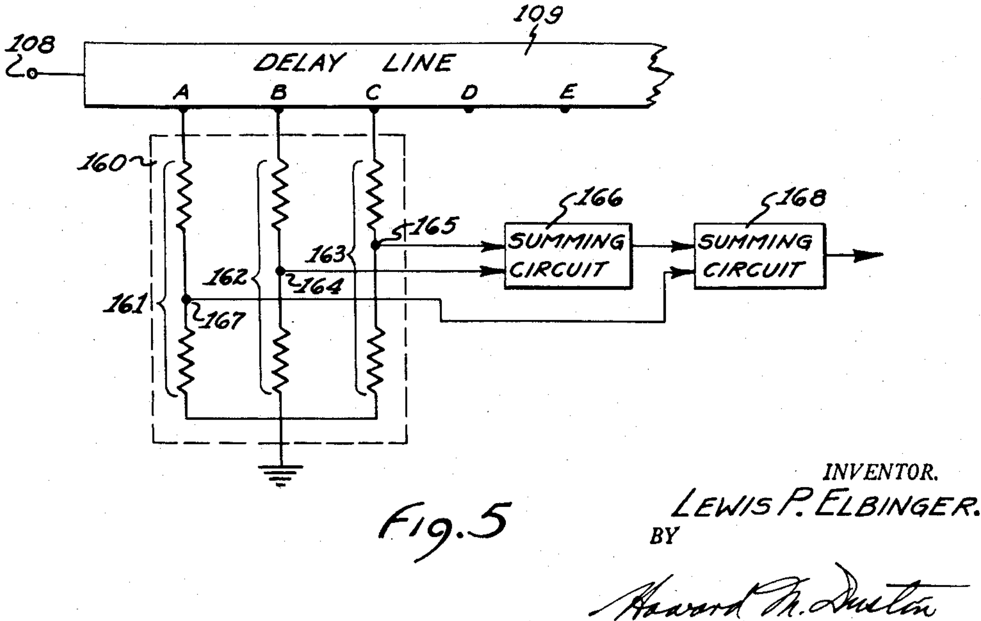
Figure 5 is a schematic diagram of a circuit for employment in the embodiment of Fig. 4.

Referring once more to Fig. 4, voltage divider network 160 is shown connected to a summing network 169 which comprises summing circuits 166 and 168 of Fig. 5. The output signal of the summing network 169 is the output signal of summing circuit 168. As has been previously described, the swing of the output signal of summing network 169 through zero to a positive value is employed to indicate the presence of the waveshape in the delay line. The output signal of summing network 169 is applied to a Schmitt trigger circuit 171. The Schmitt trigger circuit is a well-known type of network, which is driven from a first state to a second state, where it remains so long as the input voltage applied thereto exceeds a predetermined level. Upon reduction of the input voltage to a particular lower level, the Schmitt trigger circuit returns to its first state. An example of such a circuit is shown in a book by L. W. Von Tersch and A. W. Swago, "Recurrent Electrical Transients," page 277, Prentiss-Hall Inc., New York, 1953. Thus, trigger circuit 171 is driven to its second state when the output signal of summing network 169 goes through zero and becomes positive. The output signal of trigger circuit 171 is applied to a first monostable multivibrator 172, which in turn drives a second monostable multivibrator 173. Each of these monostable multivibrators is adapted to deliver an output signal at a predetermined time after application of an input signal thereto. Multivibrator 172 determines the delay before an output pulse is provided by multivibrator 173, following the time when the output signal of summing network 169 passes through zero and becomes positive. This delay is that necessary for the waveshape to move to a position close to its reference position in the delay line. Multivibrator 173 generates the positive sampling trigger signal of desired duration. The sampling trigger signal is sufficiently broad to insure that the waveshape reaches its reference position during the occurrence thereof. The sampling trigger signal delivered by multivibrator 173 is applied as a gating pulse to each of gates 142—144.

*Summary*

There has thus been described apparatus for automatically reading human language symbols printed on a document by recognizing respective waveshapes derived from these symbols, wherein the reliability and accuracy of said apparatus is substantially improved by novel circuits which increase the symbol dependability factors. These novel circuits increase the symbol dependability factor by providing substantially zero amplitude signals on all symbol identification output leads except that lead corresponding to the symbol being read by the apparatus.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus for recognizing each of *n* different signals, comprising sampling means for receiving any one of said signals and in response thereto for providing *n* samples of said signal, and *n* channels connected to said sampling means and responsive to the samples provided thereby, each one of said *n* channels corresponding to a respective one of said *n* signals, each one of said *n* channels being adapted to provide an output signal having substantially zero amplitude whenever said samples from said sampling means are provided in response to any one of said $n$ signals except the signal corresponding to said one channel.

2. Apparatus for recognizing each of $n$ different signals, comprising sampling means for receiving any one of said signals and in response thereto for providing a set of $n$ samples of said signal, the $n$ samples of the set provided for each of said signals representing the components of a respective one of $n$ signal-associated vectors in $n$-dimensional space, each different subset of $n-1$ of said $n$ signal-associated vectors defining a respective one of $n$ surfaces in said $n$-dimensional space; and $n$ multiplying groups; each of said multiplying groups comprising $n$ multiplying means, said $n$ multiplying means of each of said groups being coupled to said sampling means to receive a respective one of said samples, each of said multiplying means being adapted to multiply the value of the sample received thereby by a predetermined factor; the $n$ predetermined factors of each of said groups corresponding to the components of a respective one of $n$ group-associated vectors, each of said group-associated vectors being orthogonal to a respective one of said $n$ surfaces.

3. Apparatus as in claim 2, further including $n$ summing circuits, each one of said summing circuits being connected to receive the $n$ multiplied samples provided by a respective one of said multiplying groups, each of said summing circuits being adapted to provide an output signal representing the summation of all the multiplied samples received thereby.

4. Apparatus for recognizing each of $n$ different waveshapes, comprising sampling means for receiving any one of said waveshapes and in response thereto for providing $n$ samples of said waveshape, and $n$ channels connected to said sampling means and responsive to the samples provided thereby, each one of said $n$ channels corresponding to a respective one of said $n$ waveshapes, each one of said $n$ channels being adapted to provide an output signal having substantially zero amplitude whenever said samples from said sampling means are provided in response to any one of said $n$ waveshapes except the waveshape corresponding to said one channel.

5. Apparatus for recognizing each of $n$ different waveshapes, comprising wave transmission means adapted to receive any one of said waveshapes and to propagate said waveshape therealong, said transmission means being provided with $n$ wave sampling points spaced therealong; $n$ voltage divider networks; each of said divider networks comprising $n$ voltage dividers, said $n$ voltage dividers of each one of said divider networks being connected to respective ones of said $n$ sampling points; $n$ summing circuits; and means for connecting each one of said summing circuits to receive the $n$ output signals of all voltage dividers of a respective one of said divider networks, each of said summing circuits being adapted to provide an output signal corresponding to the sum of the signal amplitudes delivered by all of the taps of the divider network connected thereto, each of said divider networks and the summing circuit connected thereto corresponding to a respective one of said $n$ waveshapes, each of said divider networks having the voltage dividers thereof so designed that the output signal of the summing circuit connected thereto is substantially zero whenever any one of said $n$ waveshapes except the waveshape corresponding thereto occupies a predetermined position in said transmission means.

6. Apparatus for recognizing each of $n$ different waveshapes, comprising sampling means for receiving any one of said waveshapes and in response thereto for providing $n$ samples of said waveshape; $n$ multiplying groups; each one of said multiplying groups comprising $n$ multiplying means, said $n$ multiplying means of each one of said groups being coupled to said sampling means to receive a respective one of said samples, each of said multiplying means being adapted to deliver an output signal representing the product of the amplitude of the sample received thereby and a factor $r_{ij}$ determined in accordance with the solution of the following equation set:

$$\begin{array}{lllllll}
r_{i1}s_{11} & + r_{i2}s_{12} & + r_{i3}s_{13} & + \ldots + & r_{in}s_{1n} & = 0 \\
r_{i1}s_{21} & + r_{i2}s_{22} & + r_{i3}s_{23} & + \ldots + & r_{in}s_{2n} & = 0 \\
r_{i1}s_{31} & + r_{i2}s_{32} & + r_{i3}s_{33} & + \ldots + & r_{in}s_{3n} & = 0 \\
\cdot & \cdot & \cdot & & \cdot & \cdot \\
r_{i1}s_{i-1,1} & + r_{i2}s_{i-1,2} & + r_{i3}s_{i-1,3} & + \ldots + & r_{in}s_{i-1,n} & = 0 \\
r_{i1}s_{i+1,1} & + r_{i2}s_{i+1,2} & + r_{i3}s_{i+1,3} & + \ldots + & r_{in}s_{i+1,n} & = 0 \\
\cdot & \cdot & \cdot & & \cdot & \cdot \\
r_{i1}s_{n1} & + r_{i2}s_{n2} & + r_{i3}s_{n3} & + \ldots + & r_{in}s_{nn} & = 0
\end{array}$$

wherein $r_{ij}$ represents the multiplying factor of the $j$th multiplying means of the $i$th multiplying group and $s_{uv}$ represents the $v$th sample of the $u$th waveshape; and $n$ summing circuits, each one of said summing circuits being connected to receive the $n$ output signals provided by a respective one of said $n$ multiplying groups, each of said summing circuits being adapted to deliver a signal representing the summation of all the signals received thereby.

7. Apparatus for recognizing each of $n$ different waveshapes, comprising a delay line adapted to receive any one of said waveshapes, said delay line being provided with $n$ wave sampling points spaced therealong; $n$ voltage divider networks; each of said voltage divider networks comprising $n$ voltage dividers, said $n$ voltage dividers of each one of said divider networks being connected to respective ones of said $n$ sampling points, each of said voltage dividers being adapted to deliver an output signal representing the product of the amplitude of the signal received from the corresponding connected sampling point and a factor $r_{ij}$ determined in accordance with the solution of the following equation set:

$$\begin{array}{lllllll}
r_{i1}s_{11} & + r_{i2}s_{12} & + r_{i3}s_{13} & + \ldots + & r_{in}s_{1n} & = 0 \\
r_{i1}s_{21} & + r_{i2}s_{22} & + r_{i3}s_{23} & + \ldots + & r_{in}s_{2n} & = 0 \\
r_{i1}s_{31} & + r_{i2}s_{32} & + r_{i3}s_{33} & + \ldots + & r_{in}s_{3n} & = 0 \\
\cdot & \cdot & \cdot & & \cdot & \cdot \\
r_{i1}s_{i-1,1} & + r_{i2}s_{i-1,2} & + r_{i3}s_{i-1,3} & + \ldots + & r_{in}s_{i-1,n} & = 0 \\
r_{i1}s_{i+1,1} & + r_{i2}s_{i+1,2} & + r_{i3}s_{i+1,3} & + \ldots + & r_{in}s_{i+1,n} & = 0 \\
\cdot & \cdot & \cdot & & \cdot & \cdot \\
r_{i1}s_{n1} & + r_{i2}s_{n2} & + r_{i3}s_{n3} & + \ldots + & r_{in}s_{nn} & = 0
\end{array}$$

wherein $r_{ij}$ represents the multiplying factor of the $j$th voltage divider of the $i$th voltage divider network and $s_{uv}$ represents the $v$th sample of the $u$th waveshape; and $n$ summing circuits, each one of said summing circuits being connected to receive the $n$ output signals provided by a respective one of said $n$ voltage divider networks, each of said summing circuits being adapted to deliver a signal representing the summation of all the signals received thereby.

No references cited.